US010229675B2

(12) United States Patent
Scheiner et al.

(10) Patent No.: US 10,229,675 B2
(45) Date of Patent: Mar. 12, 2019

(54) SCALABLE DYNAMIC CLASS LANGUAGE MODELING

(71) Applicant: GOOGLE LLC, Mountain View, CA (US)

(72) Inventors: Justin Max Scheiner, New York, NY (US); Petar Aleksic, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 44 days.

(21) Appl. No.: 15/396,045

(22) Filed: Dec. 30, 2016

(65) Prior Publication Data

US 2017/0358297 A1    Dec. 14, 2017

Related U.S. Application Data

(60) Provisional application No. 62/347,250, filed on Jun. 8, 2016.

(51) Int. Cl.
*G06F 15/00* (2006.01)
*G10L 15/197* (2013.01)
(Continued)

(52) U.S. Cl.
CPC ........ *G10L 15/197* (2013.01); *G06F 17/2775* (2013.01); *G06F 17/30684* (2013.01);
(Continued)

(58) Field of Classification Search
CPC .. G06F 17/2785; G06F 17/274; G06F 17/271; G06F 17/2765; G06F 17/30654;
(Continued)

(56) References Cited

U.S. PATENT DOCUMENTS 7,016,849 B2 * 3/2006 Arnold ................... G10L 15/32
                                                   704/275
7,925,505 B2 * 4/2011 Wu ....................... G10L 15/193
                                                   704/236
(Continued)

FOREIGN PATENT DOCUMENTS

WO       2006/037219      4/2006

OTHER PUBLICATIONS

Vasserman et al. "Contextual language model adaptation using dynamic classes," 2016 IEEE Spoken Language Technology Workshop, Dec. 1, 2016, 6 pages.
(Continued)

*Primary Examiner* — Edgar X Guerra-Erazo
(74) *Attorney, Agent, or Firm* — Fish & Richardson P.C.

(57) ABSTRACT

This document generally describes systems and methods for dynamically adapting speech recognition for individual voice queries of a user using class-based language models. The method may include receiving a voice query from a user that includes audio data corresponding to an utterance of the user, and context data associated with the user. One or more class models are then generated that collectively identify a first set of terms determined based on the context data, and a respective class to which the respective term is assigned for each respective term in the first set of terms. A language model that includes a residual unigram may then be accessed and processed for each respective class to insert a respective class symbol at each instance of the residual unigram that occurs within the language model. A transcription of the utterance of the user is then generated using the modified language model.

22 Claims, 7 Drawing Sheets

(51) Int. Cl.
*G06F 17/30* (2006.01)
*G10L 15/22* (2006.01)
*G10L 15/30* (2013.01)
*G06F 17/27* (2006.01)
*G10L 15/18* (2013.01)

(52) U.S. Cl.
CPC ........ *G06F 17/30743* (2013.01); *G10L 15/22* (2013.01); *G10L 15/30* (2013.01); *G10L 15/1815* (2013.01); *G10L 2015/223* (2013.01)

(58) Field of Classification Search
CPC ......... G06F 17/30976; G06F 17/30401; G06F 17/2881; G10L 15/22; G10L 15/197; G10L 15/04; G10L 15/18; G10L 15/1815; G10L 15/1822; G10L 15/183; G10L 15/265
See application file for complete search history.

(56) References Cited

U.S. PATENT DOCUMENTS 8,676,580 B2* 3/2014 Deshmukh ............ G10L 15/197
704/231
2003/0182131 A1* 9/2003 Arnold ................... G10L 15/32
704/275
2006/0069678 A1* 3/2006 Chou ................ G06F 17/30707
2008/0040099 A1* 2/2008 Wu ....................... G06F 17/275
704/9
2008/0255844 A1* 10/2008 Wu ....................... G10L 15/193
704/255
2013/0046539 A1* 2/2013 Deshmukh ............ G10L 15/197
704/239

OTHER PUBLICATIONS

International Search Report and Written Opinion in International Application No. PCT/US2016/069474, dated Feb. 28, 2017, 13 pages.
Aleksic et al. "Bringing Contextual Information to Google Speech Recognition," Interspeech 2015, Sep. 6, 2015, 5 pages.
Written Opinion issued in International Application No. PCT/US2016069474, dated May 3, 2018, 6 pages.
International Preliminary Report on Patentability issued in International Application No. PCT/US2016/069474, dated Jul. 25, 2018, 8 pages.

* cited by examiner

SCALABLE DYNAMIC CLASS LANGUAGE MODELING

CROSS-REFERENCE TO RELATED APPLICATION

This application claims the benefit of U.S. Provisional Application No. 62/347,250, filed Jun. 8, 2016, the contents of which are incorporated by reference.

FIELD

The document generally relates to automated speech recognition and the use of class-based language models to transcribe speech to text.

BACKGROUND

Speech recognition has become a widely adopted and frequently used mode of interacting with computing devices. Speech input may be more convenient and efficient than traditional input modes such as typing through a keyboard. For example, mobile computing devices may offer speech recognition services as an alternative input mode to typing characters through a virtual keyboard on a touchscreen. Some computing devices are configured to accept voice commands from a user as a shortcut to performing certain actions on the computing device. Voice commands and other speech can be transcribed to text using language models that predict the likelihood that one or more sequences of terms occur in the speech. Some language models group related terms into classes and can predict the likelihood that a class of terms occurs in a speech sample.

SUMMARY

This document generally describes systems, methods, and other techniques for dynamically adapting speech recognition for individual voice queries of a user using class-based language models. In general, a speech recognition system is capable of generating query-specific class models that each include a collection of related terms that the user is likely to say when he/she is in a particular context (e.g., song titles when a user is using a media player application). The system also obtains a set of class-based language models. Each class-based language model in the set can correspond to a particular class and can indicate probabilities of language sequences that include at least one term belonging to the particular class. In some implementations, each class-based language model in the set can correspond to a different one of multiple candidate classes.

The speech recognition system then accesses a generic language model that includes a residual unigram that represents a residual set of terms in a language. For example, the residual unigram may be an unknown terms unigram that represents rarely occurring terms in a language or terms that are outside of the language model's vocabulary. The system then inserts respective class symbols associated with each class model at each instance of the residual unigram within a language model. Thus, the processed language model may include multiple class symbols at each instance of the residual unigram.

During the speech decoding process, for a particular candidate transcription that is determined to include a residual unigram, the system first identifies the appropriate class symbol to replace the instance of the residual unigram (e.g., based on respective probabilities specified by the class-based language models), and then selects a particular term from the collection of terms specified by the corresponding class model to insert into the position of the class symbol within the candidate transcription sequence. The particular term can be selected, for example, by phonetically transcribing a corresponding portion of the user's utterance, and identifying a term within the collection of terms specified by the class model that most resembles the phonetic transcription. In this regard, the system is capable of dynamically inserting class terms from a set of query-specific class models to efficiently improve recognition capabilities when a user's utterance includes strange or uncommon terms that are unlikely to accurately recognized using basic speech recognition techniques.

Some implementations may include a method performed by one or more computers. The method may include receiving a voice query from a user that includes (i) audio data corresponding to an utterance of the user, and (ii) context data associated with at least one of the audio data or the user. In response to receiving the voice query, one or more class models are then generated. The one or more class models collectively identify (i) a first set of terms determined based on the context data associated with the at least one of the audio data or the user and (ii) for each respective term in the first set of terms, a respective class to which the respective term is assigned. At least some terms in the first set of terms are assigned to different ones of a plurality of classes. A language model that includes a residual unigram representing a set of terms may then be accessed. The language model may be processed for each respective class among the plurality of classes to insert, at each instance of the residual unigram that occurs within the language model, a respective class symbol associated with the respective class. A transcription of the utterance of the user is then generated using the modified language model.

These and other implementations may include one or more of the following features. For instance, generating the transcription of the utterance of the user may include accessing one or more class-based language models that correspond to respective classes to which one or more terms within the first set of terms are assigned. A respective probability that a term within the respective class occurs within a candidate language model sequence at a position in the candidate language model sequence that corresponds to a position to a position of the respective class symbol for each respective class symbol that was inserted into the modified language model and based at least on probabilities indicated by a particular one of the class-based language models that corresponds to the respective class indicated by the respective class symbol is then determined. The transcription of the utterance of the user using the determined probabilities are then generated.

The one or more class models can include a single class model that identifies the first set of terms. In addition, each respective term in the first set of terms can be labeled with a respective class symbol that identifies the respective class to which the respective term is assigned, and the single class model can include terms assigned to the different ones of the plurality of classes.

Generating the one or more class models can include generating multiple class models corresponding to different classes, and merging the multiple class models into a single class that includes terms assigned to different classes.

The residual unigram can represent infrequently occurring terms within a corpus of text samples in a language model.

The residual unigram can be associated with a residual class model that identifies the second set of terms. The one or more class models can be generated by adding the first set of terms to the residual class model.

Processing the language model can be based on accessing the residual class model, and identifying the plurality of classes based at least on the first set of terms in the residual class model being assigned among the plurality of classes.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 3A illustrates an initial word lattice in which identified unknown words are indicated by a residual unigram (#UNK). FIG. 3B illustrates an intermediate word lattice in which respective class symbols associated with different class models are inserted into the word lattice from FIG. 3A at each instance of the residual unigram. FIG. 3C illustrates an augmented word lattice in which the most probable classes are selected and individual terms from the classes are spliced into the word lattice from FIG. 3B.

In the drawings, like reference numbers represent corresponding parts throughout.

DETAILED DESCRIPTION

Figure 1:
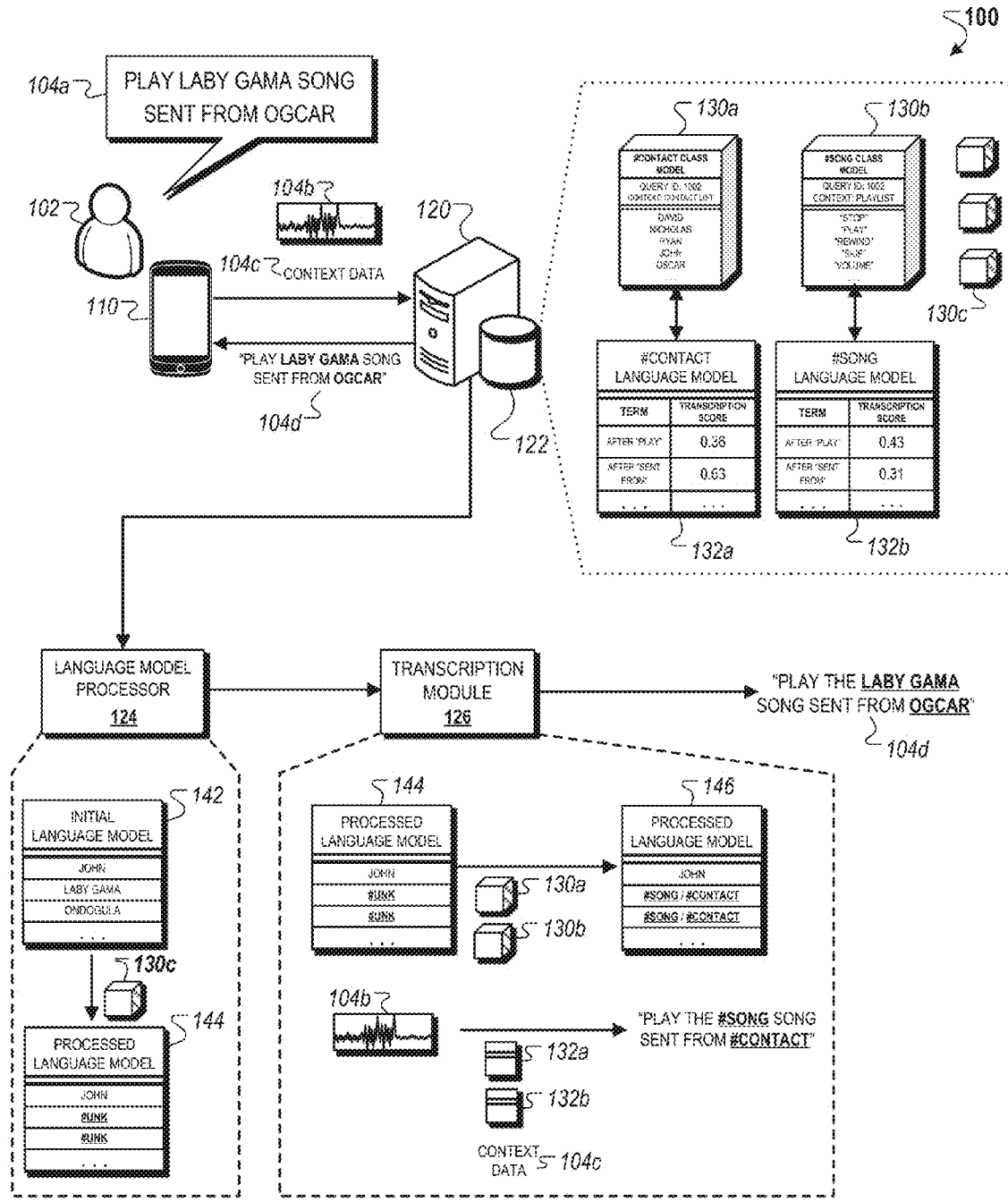
FIG. 1 is a conceptual diagram of an exemplary system that has adaptive query-specific speech recognition capabilities for transcribing an utterance. In some implementations, the system depicted in FIG. 1 may be used to perform the methods described herein.

This document generally describes systems, methods, and other techniques for dynamically adapting speech recognition for individual voice queries of a user using class-based language models. The systems and methods may address problems associated with automated speech recognition and automatically transcribing speech to text. In some implementations, in response to receiving a voice query and associated context data, a speech recognition system compiles (e.g., on the fly) class models that specify a set of terms corresponding to a particular context that is potentially relevant to the voice query (e.g., user contacts, local restaurant names, applications previously used by the user). Each class model specifies a class designation with which the set of terms within the class model is assigned to (e.g., song class, contacts class, etc.). Each class model is also associated with a corresponding class-based language model that indicates probabilities of language sequences that include at least one term belonging to the particular class.

The speech recognition system utilizes the class models and the corresponding class-based language models to allow for more adaptable recognition capabilities when a user's utterance include strange or uncommon terms that are unlikely to accurately recognized using basic speech recognition techniques. For example, the speech recognition system may incorporate residual unigrams (e.g., a unigram that represents unknown terms that are unlikely to be included in a language) within a generic language model, and then insert a predicted class term from a collection of terms of a class model at each instance of the residual unigram within the generic language model in order to increase the recognition accuracy of the strange or uncommon terms provided by the user. In addition, because each of the class models and corresponding class-based language models specify terms and probabilities that are specific to the user's activities (e.g., based on prior user data while in a particular context), the recognition capabilities using such techniques are capable of being adjusted on a query-by-query basis.

For context, language models are generally capable of determining likelihoods (e.g., probabilities) that a given sequence of terms would occur in a language. N-gram models, for example, may indicate the probability of a particular term following a sequence of n-1 terms that precede the particular term. Thus, a 4-gram model may indicate the relative statistical likelihoods that the fourth term in the phrase, "The car is <garbled>", is either "red," "blue," "broken," "big," or another term.

In some implementations, the probabilities that a language model assigns to sequences of terms reflect statistical occurrences of the sequences in a set of data that was used to train the language model. For example, the language model may be developed by examining a vast amount of language from sources such as webpages and other electronic documents, query logs, books, social media, etc. The relative frequencies of sequences of terms in the source data may be determined and used as the basis for a language model. One consideration that arises in creating language models, however, is that it is often difficult to train the model over a sufficiently large body of data to reliably estimate the likelihood of all permutations of the many terms that occur in a language. To this end, class-based language models can be employed, which leverage statistics among related terms in a language, thereby allowing the language model to predict the likelihood of sequences of terms, even for terms that do not often occur in the training data.

Class-based language models are generally language models programmed to determine likelihoods (e.g., probabilities) that a given sequence of terms and class-symbols would occur in a language. In some implementations, the class-based language model may be trained by replacing original terms in the training data, which belong to predefined classes of terms (e.g., topically related categories of terms), with corresponding class-based symbols. For example, consider the training sentence "Larry's favorite pastime is watching Seinfeld re-runs and eating pizza." This sentence may be processed to replace its class-based terms with corresponding class-symbols as follows: "#name favorite pastime is watching #tv_show re-runs and eating #food." The class-based terms that were removed from the sentence may then be added to a respective class model (e.g., "Larry" may be added to a #names class model, "Seinfeld" may be added to a #tv_show class model, and "pizza" may be added to a #food class model). The class models may each include a collection of terms belonging to the respective class for the model, and may also store data indicating the relative probabilities that each term in the class occurs in a language or in a given utterance. The #tv_show class model, for example, may include a list of TV shows, and may include respective probabilities that each show occurs in a given language sample. At runtime, the class-based language model in a speech recognizer may then identify the classes for class-based terms in an utterance or other language sequence based on terms adjacent to or near the class-based term, and/or based on context data external to the language sequence. Once the classes are identified, the language model may access the corresponding class models that indicate lists of terms for the identified classes, and one or more class-based terms selected from the class models for a transcription of an utterance. For example, a class-based language model in a speech system that is decoding the utterance for "Larry's favorite pastime is watching Seinfeld re-runs and eating pizza," may determine that the utterance includes class-based terms from both the #tv_show class and the #food class based on the preceding terms "watching" and "eating," respectively. The language model's #tv_show class may include a multitude of different television show titles, from which the term "Seinfeld" is selected (e.g., based on an acoustical analysis of the utterance, and/or based on external context such as profile data for the speaker that indicates Seinfeld is a favorite show of the speaker). Similarly, the term pizza may be selected from the #food class.

In some cases, a speech system may dynamically generate class models that are customized to a specific speaker, the context of a specific utterance, or both. These customized class models may facilitate accurate decoding of utterances that include class-based terms, including class-based terms that are overrepresented in the lexicon of a particular speaker as compared to the language generally. For example, a general class-based language model that has been trained on a broad-base of training samples in a language may be much more likely to incorrectly transcribe the utterance "I invited Jacki to the house for dinner" as "I invited Jackie to the house for dinner" (misspelled name) because, although phonetically identical, the name "Jackie" is more common as an English name than is the name "Jacki." However, some speakers are much more likely to refer to "Jacki" without an -e than would the general population, such as speakers who are friends, family, or colleagues with a "Jacki," or who otherwise communicate frequently with a "Jacki." Therefore, before determining a transcription for the utterance, the speech system may dynamically generate a speaker- (user-) specific class model that skews the likelihood of an utterance from the speaker including the name "Jacki" higher than the likelihood for "Jackie."

In some implementations, the class-based language model may be generated by augmenting lists of class-based terms in a general class-based language model with class-based terms that are determined to be relevant to a context of an utterance that is to be decoded, such as information about the speaker of the utterance. The classes in a class-based language model may include only class-based terms that are determined to relevant to a context of the utterance (e.g., user-specific or utterance-specific terms), or they may include a mix of generally determined and user-specific or utterance-specific terms. In some implementations, terms that were not included in the classes of a static or general language model may be added to the classes of a custom, dynamically generated language model. In some implementations, the probabilities associated with terms in a general language model may be adjusted in the custom, dynamically generated language model. For example, upon receiving a request to transcribe an utterance spoken by Bill, a speech recognition system may obtain (e.g., from a local or remote context server) context data associated with Bill and/or the specific utterance that is to be transcribed. The context data may include, for example, an indication of the location that the utterance was spoken, a list of names in Bill's contact list, a list of names of users to whom Bill is connected on social media, or a combination of these and more. The context data may show that one of Bill's closest contacts is Jacki. Accordingly, the speech system may dynamically generate a customized #names class model for transcribing Bill's utterance, which may be incorporated into a dynamic, user-specific class-based language model. The customized language model may add all or some of Bill's contacts to the #names class, and/or may re-calculate the probability distribution among the terms in the #names class. For example, the term "Jacki" may be assigned a higher probability, whereas the term "Jackie" may be removed from the class or assigned a lower probability.

In some implementations, a speech system may automatically and dynamically generate a customized class-based language model for every request that it receives to transcribe an utterance. For example, if the speech system were implemented as a cloud-based service for transcribing utterances from a wide range of users, the speech system may dynamically generate a custom class-based language model for the specific user who submitted a request to transcribe an utterance (under the assumption that the user is the speaker, for example). Before the speech system has transcribed the utterance, however, the speech system may be unaware of which classes, if any, are implicated in the utterance for any given request. Accordingly, the speech system may generate, on the fly, dynamic class models for all the classes for which context data is available. For example, upon receiving a request to transcribe an utterance from the user Bill, the speech system may dynamically generate a class-based language model that includes a range of customized classes. After the custom classes and language model are built, the speech system may then use the custom language model to decode the utterance, and to determine a transcription for the utterance.

FIG. 1 is a conceptual diagram of an exemplary speech recognition system 100 that has adaptive query-specific recognition capabilities for transcribing an utterance of a user 102. The system 100 includes a user device 110 that receives audio data 104b encoding an utterance of a voice query 104a submitted by the user 102. The user device 110 also obtains and/or stores context data 104c associated with the user 102 (e.g., historical activity data), or associated with the voice query 104a (e.g., reference to information included within the query, present user location, etc.).

In general, the example in FIG. 1 illustrates how the system 100 may be used to generate a transcription for a voice query that includes unusual or uncommon words that are likely to be detected as unknown words by traditional speech recognition systems. For instance, such speech recognition systems may incorrectly transcribe the terms "LABY GAMA" and "OGCAR" as "LADY GAGA" and "OSCAR," respectively, because the latter terms are significantly more likely to occur within a language specified by a generic language model. However, the system 100, with its use of class models and class-based language models, may instead use techniques described below to correctly transcribe the unusual or uncommon terms included within voice query 104a.

The system 100 also includes a server 120 with an associated database 122 that stores class models 130a and 130b and corresponding class-based language models 132a and 132b, and a residual unigram model 130c. The server 120 includes software modules such as a language model processor 124 and a transcription module 126 that execute processes related to speech recognition as described more particularly below.

Referring to the example depicted in FIG. 1, the user initially submits the voice query 104a with an instruction to place a song sent from a contact (e.g., "PLAY LABY GAMA SONG SENT FROM OGCAR"). The voice query 104a is encoded as the audio data 104b and transmitted, along with the context data 104c, from the user device 110 to the server 120. The server 120 then initiates a speech recognition process, including generating and using the dynamic class models 130a and 130b to insert class terms within a candidate transcription sequence. The output of the speech recognition process is the transcription 104d, which is then provided back to the user device 110 for output in response to the received voice query 104a.

The system 100 initially detects an utterance of the voice query 104a at the user device 110. The user device 110 may generally be any type of electronic computing device that is capable of detecting and recording audio data, and facilitating processing of the audio data locally on the user device 110, or at the server 120, or both. For example, the user device 110 may be a smartphone, a tablet computing device, a notebook computer, a personal desktop computer, a smartwatch or any other type of wearable computing device, or any other type of electronic device. In some implementations, the user device 110 may include a speech recognition service that runs within an operating system or an application executed on the user device 110. The speech recognition service may convert speech to text, or may perform certain actions on the user device 110 in response to receiving voice commands from the user 102.

The user device 110 may further include a microphone that detects an audio signal when the user 102 speaks an utterance, and an analog-to-digital (A/D) converter that digitizes the audio signal. The user device 110 may also include a networking interface for communicating with other computers over wired and wireless networks, an electronic display, and other user input mechanisms, some of which are described with respect to FIG. 6 below.

Upon detecting the utterance of the voice query 104a, the user device 110 provides audio data 104b of the utterance to a speech pre-processor that may be located on the user device 110, the server 120, or both. The speech pre-processor may generally serve as a first stage of a speech recognizer that is configured to transcribe the utterance to text. The speech pre-processor can generate processed speech data that is capable of recognition by the decoder and its associated language models. In some implementations, the pre-processor includes an acoustic model that determines phenomes or other linguistic units of the utterance from the audio data 104b.

The acoustic model may determine the most likely set of candidate phonemes or linguistic units that are spoken in short time intervals of the utterance of the voice query 104a. This data can then be used by the decoder to transcribe the utterance. The decoder can include, or operate in conjunction with, language models that generally operate at a higher semantic level than the acoustic model. For example, whereas the acoustic model may map very short segments of the audio signal to short linguistic units (e.g., phonemes) with little, if any, concern for how the linguistic units piece together to form a coherent transcription, the language models may make sense of the collection of linguistic units to determine a transcription result that reflects actual sequences of terms that are likely to occur in a language.

The speech recognizer of the system 100 may be implemented locally on the user device 110, or remotely from the user device 110 (e.g., on the server 120). In some implementations, different components of the recognizer may be implemented locally, while other are implemented remotely. In implementations where the speech recognizer is implemented remotely, the user device 110 may transmit the audio data 104b to a server 120 that implements the speech recognizer on one or more computers separate and apart from the user device 110. For example, the user device 110 may send the audio data 104b (e.g., in a compressed and encrypted format) to the server 120 over the Internet. The server 120 may then handle the received audio data 104b by providing it to the speech pre-processor and the decoder 120, and then performing the recognition processes as described below.

Upon receiving the context data 104c (and optionally the audio data 104b), the server generates a set of class models 130a and 130b that each includes a collection of terms that belong to a particular class for the respective class model (e.g., SONG and CONTACT class models as depicted in FIG. 1). The class models 130a and 130b are compiled by the server 120 after each submitted voice query so that the collection of terms accurately reflects up-to-date information at the time of query submission. As an example, if the user 102 adds a new contact to his/her contact list after the most recently submitted voice query, but before the submission of the voice query 104a, the class model 130a is compiled after receiving the audio data 104b so that the newly added contact is included within the class model 130a. In this regard, stored class models within the database 122 can be adjusted by the server 120 on a query-by-query basis to more accurately reflect changes in class-related information (e.g., contact list).

In some implementations, in addition to adjusting pre-existing stored class models, the server 120 is also capable of generating new class models in response to receiving a voice query (e.g., in response to receiving context data 104c associated with a voice query). For example, the server 120 may generate a new class model if the received context data 104c indicates that the user has recently performed a particular action that is associated with a new group of terms (e.g., performing actions related to a new location that the user has entered into). In other examples, the server 120 may also be capable of generating new temporary class models that are associated with a user for a predetermined time when a user is in a particular context (e.g., during a trip when the user is temporarily in a particular location). In these examples, the server 120 may be capable of identifying the applicable class models to use within the recognition process based on the context information included with context data 104c.

Although FIG. 1 depicts two examples of class models being compiled by the server 120 in response to receiving the voice query 104a, in other implementations, the server 120 is capable of compiling a greater number of class models based on the information associated with the voice query 104a or the context data 104c. For example, the server 120 may compile a large number of class models to increase the probability of generating an accurate transcription if the context data 104c indicates large variations in user behavior and/or if the voice query 104a includes a large number of strange or unknown words.

The server 120 may also obtain a set of class-based language models 132*a* and 132*b* that correspond to the compiled class models 130*a* and 130*b*, respectively. In some implementations, the system may have generated and stored the class-based language models 132*a* and 132*b* before receiving the voice query including audio data 104*b* and context data 104*c*. The language models 132*a* and 132*b* may be a set of class-based language models that are trained on language sequences that include class symbols in place of class-based terms that initially occurred in the language sequence. For example, a first class-based language model corresponding to the songs class may be generated by identifying a set of text samples (i.e., language sequences) that all include song names (i.e., particular class terms), pre-processing the text samples to replace the song names in the text samples with a class symbol (e.g., #SONGS), and then training the language model using the pre-processed text samples so that the language model identifies probabilities that different combinations of terms in a language would include a song name as indicated by the #SONGS class symbol. A similar process may be employed to generate a second class-based language model corresponding to the contacts class, although with processed text samples that each includes a #CONTACTS class symbol. For instance, in the example depicted in FIG. 1, the language model 132*a* specifies a higher probability of "0.63," compared to the language model 132*b* specifying a lower probability of "0.31" for a class term occurring after "SENT FROM" within a candidate transcription sequence. This indicates that a CONTACT class term is more likely to occur after the terms "SENT FROM" within a candidate transcription sequence. This concept is depicted more particularly in FIG. 3B.

In some implementations, the class-based language models 132*a* and 132*b* may be trained specifically for a particular user based on training the language models with training data that includes prior sentences or examples submitted by the user 102 that include class terms. As described herein with respect to other processes, the training procedures for the class-based language models 130*a* and 130*b* may be iteratively performed between successive query submissions to adjust indicated respective probabilities based on reoccurring user behaviors and/or updated context data obtained by the user device 110.

As the server 120 compiles the class models 130*a* and 130*b*, the server 120 also obtains a residual unigram model 130*c* and incorporates the obtained model into the initial language model 142. Generally speaking, the residual unigram model 130*c* can identify a list terms that are likely to be problematic for recognition due to any of a variety of reasons. For instance, the residual unigram model 130*c* may include a collection of terms that have been previously incorrectly transcribed by the speech recognizer of the system 100, that are unlikely to be included within the language specified by a language model of the speech recognizer, or that are out-of-vocabulary (OOV) of the user 102. In other instances, the residual unigram model 130*c* may include terms included in queries where the user 102 has subsequently transmitted a repeat query, indicating that the included terms were incorrectly recognized by the speech recognizer. In some implementations, the residual unigram model 130*c* may also be dynamically adjusted between successive query submissions by the user 102 to adjust the collection of residual unigrams based on the recognition performance of the speech recognizer.

In some implementations, after compiling the class models 130*a* and 130*b*, and obtaining the residual unigram model 130*c*, the server 120 may then generate a union model by joining the class models 130*a* and 130*b* and the residual unigram model 130*c*. The union model includes each of the respective class terms specified by the class models 130*a* and 130*b*, and the terms specified by the residual unigram model 130*c*. An example of the union model generation is depicted more particularly with respect to FIG. 2. In some implementations, the terms that are joined from class models 130*a* and 130*b* into the union model may be labeled so as to indicate the class with which they are associated. For example, a first term that occurs in the union model that was taken from a #songs class model may be expressed in the union model as '<song>SONG_NAME</song>', whereas a second term that occurs in the union model that was taken from a #contacts class model may be expressed in the union model as '<contact>CONTACT_NAME</contact>.'

Referring now to the language model processor 124, the initial language model 142 is processed offline prior to the start of the speech recognition process performed by the system 100. The initial language model 142 may be a generic language model that specifies a set of respective probabilities for a collection of terms that indicate likelihoods that respective terms occur within a language associated with the language model.

Prior to receiving the voice query 104*a*, the language model processor 124 processes the initial language model 142 and generates the processed language model 144. The language model processor 124 may generate the modified language model 144 using a variety of techniques. In some implementations, the language model processor 124 incorporates residual unigrams into the initial language model 142 as a pre-training feature. In such implementations, the initial language model 142 is trained on data in which terms belonging to a particular class are replaced with a residual unigram symbol (e.g., "#UNK"). At runtime, the initial language model 142 then scores the likelihood that the class term at any given position within a transcription sequence is a term included within the residual unigram model 130*c*.

In some implementations, the language model processor 124 incorporates the residual unigram symbol as a post-training procedure. As one example, after the initial language model 142 is trained, the language model processor 124 can initially insert a symbol associated with a residual unigram (e.g., "#UNK") at each instance of a term that is also included within a collection of terms specified by the obtained residual unigram model 130*c*. In some implementations, the residual unigram may be provided to indicate the likelihood that other terms within the vocabulary of the language model 142 represent incorrect transcriptions of an utterance. In some implementations, the language model processor 124 can insert class symbols associated with each of the class models 130*a* and 130*b* at each instance of the residual unigrams within the language model in order to generate a modified language model 144. In the example depicted, the terms "LABY GAMA" and "ONDOGULA" within the initial language module 142 are initially identified as residual unigrams and then instances of these terms in initial language model 142 are then replaced with two class symbols (e.g., "#SONG," "#CONTACT") corresponding to the SONG and CONTACT classes of the class models 130*a* and 130*b*.

The transcription module 126 uses the modified language model 144 to generate the transcription 104*d* for the voice query 104*a*. For instance, the transcription module 126 may initially insert class symbols associated with the class models 130*a* and 130*b* into each instance of the residual unigram within the processed language model 144 in order to generate the processed language model 146. In the example depicted in FIG. 1, the transcription module 126 replaces two instances of the residual unigram symbol with two corresponding class symbols associated with the class models 130*a* and 130*b*. The inserted class symbols represent alternative transcription pathways for inserting class terms within a word lattice for a candidate transcription sequence. This process is described more particularly with respect to FIGS. 3A-3C.

The transcription module 126 then generates a candidate transcription sequence for the voice query 104*a* (e.g., "PLAY #SONG SENT FROM #CONTACT"). In generating the candidate transcription sequence, the transcription module 126 initially identifies locations within the sequence where a residual unigram symbol may be included (e.g., PLAY #UNK SONG SENT FROM #UNK) using the processed language model 144.

The transcription module 126 then selects, for each instance of the residual unigram symbol, the appropriate class symbol to replace the residual unigram symbol. For instance, the transcription module 126 identifies the appropriate class model based on the respective probabilities indicated by the class-based language models 132*a* and 132*b*. In the example depicted in FIG. 1, the transcription module 126 selects the #SONG symbol to replace the first instance of the residual unigram symbol within the candidate transcription sequence based on the language model 132*b* specifying a higher probability for a SONG term occurring after "PLAY" than the probability specified by the language model 132*a* for a CONTACT term. Likewise, the transcription module 126 selects the #CONTACT symbol to replace the second instance of the residual unigram symbol within the candidate transcription sequence based on the language model 132*a* specifying a higher probability for a CONTACT term occurring after "SENT FROM" than the probability specified by the language model 132*b* for a SONG term.

After inserting the appropriate class symbols for instances of the residual n-grams within a candidate transcription sequence, the transcription module 126 then selects the most probable class term to insert for the corresponding class symbol. In some implementations, the most appropriate term is selected based on comparing each of the terms within the class model to a phonetic transcription of a corresponding portion of the utterance of the voice query 104*a*. For example, the transcription module 126 inserts the class term "LADY GAMA" from the SONG class to replace the corresponding class symbol within the candidate transcription sequence because this term most closely resembles the utterance "LE-DI GA-MA" indicated by the audio data 104*b* encoding the utterance of the user 102. Likewise, the transcription module 126 selects the class term "OGCAR" from the CONTACT class to replace the corresponding class term within the candidate transcription sequence because this term most closely resembles the utterance "OG-CA-AR" indicated by the audio data 104*b*.

In the example depicted in FIG. 1, although the terms "LABY GAMA" and "OGCAR" are identified as residual n-grams, they are nonetheless included in the generated transcription 104*d* because the class-based language models 132*a* and 132*b* indicate high probabilities for these terms when the user is in the context associated with the class models 130*a* and 130*b* (e.g., CONTACT LIST and PLAYLIST). In this regard, the interpolated language model 146 indicates a higher probability for "LABY GAMA" than for "LADY GAGA" which is the closest term that a generic speech recognizer is likely to predict based on the increased likelihood for a query to include "LADY GAGA" over "LABY GAMA." The transcription module 126 then uses the interpolated language model 146 to insert the term "LABY GAMA" for the "#SONG" class symbol and the term "OGCAR" for the "#CONTACT" class symbol, resulting in the generated transcription 104*d*.

Figure 2:
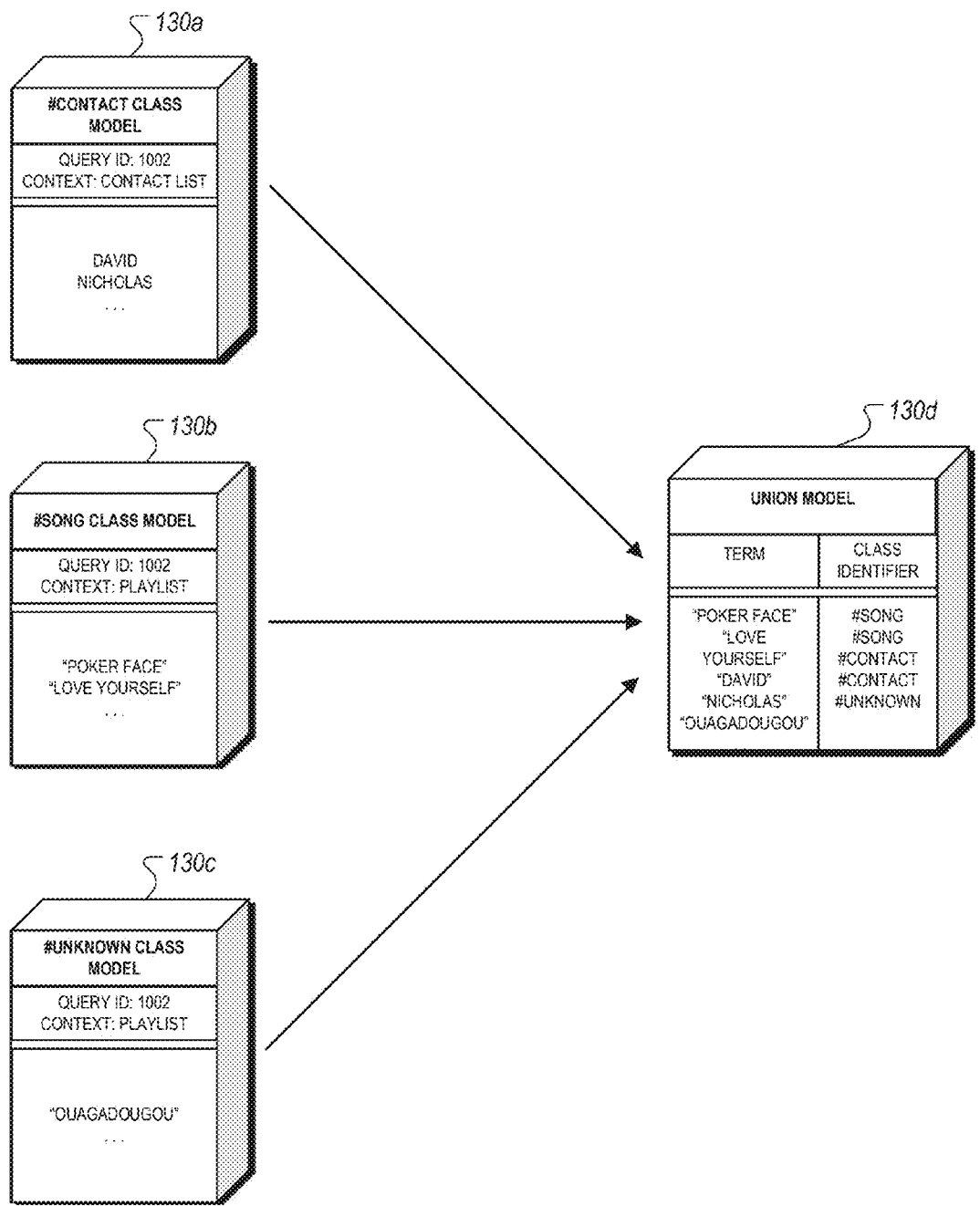
FIG. 2 depicts a graphical representation of combining class-based models with unknown words model to generate a spliced class model.

FIG. 2 depicts a graphical representation of combining class-based models 130*a* and 130*b* with a residual unigram model 130*c* to generate a union model 130*d*. As discussed herein with respect to FIG. 1, the class-based models 130*a* and 130*b* specify a collection of terms that are each assigned to a particular class (e.g., SONG class, and CONTACT class), whereas the residual unigram model 130*c* specifies a collection of terms that can be, for example, unknown words that are unlikely to occur within a language spoken by the user 102, out-of-vocabulary terms for the user 102, or other terms that can potentially cause recognition inaccuracies.

The server 120 joins the class models 130*a*, 130*b* and the residual unigram model 130*c* into a single union model 130*d* to improve processing of the initial language model 142. For instance, generation of the union model 130*d* allows the language model processor 124 to process the initial language model 142 to using a single model as opposed to successive processing using various individual class models. As depicted, the union model 130*d* includes each of the collection of terms for each class model as well as a class identifier corresponding to a respective class symbol associated with each class.

Figure 3A:
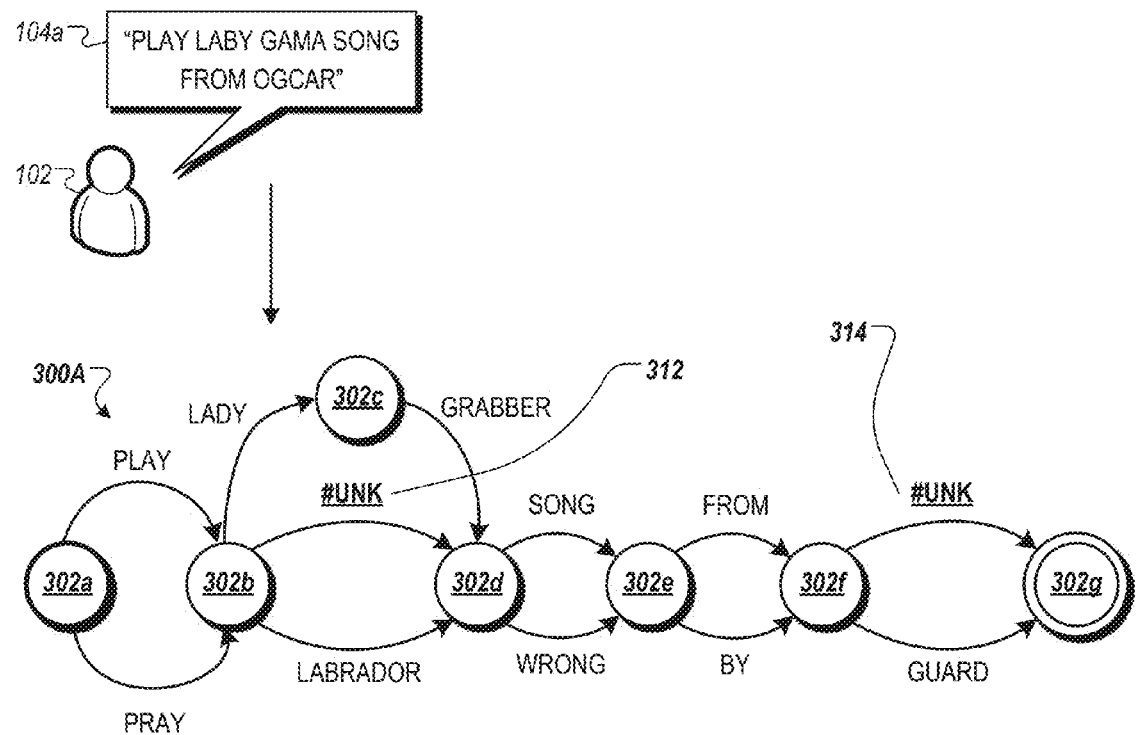
FIGS. 3A-3C depict graphical representations of word lattices generated by class-based language models for transcribing an utterance of the user.
Figure 3B:
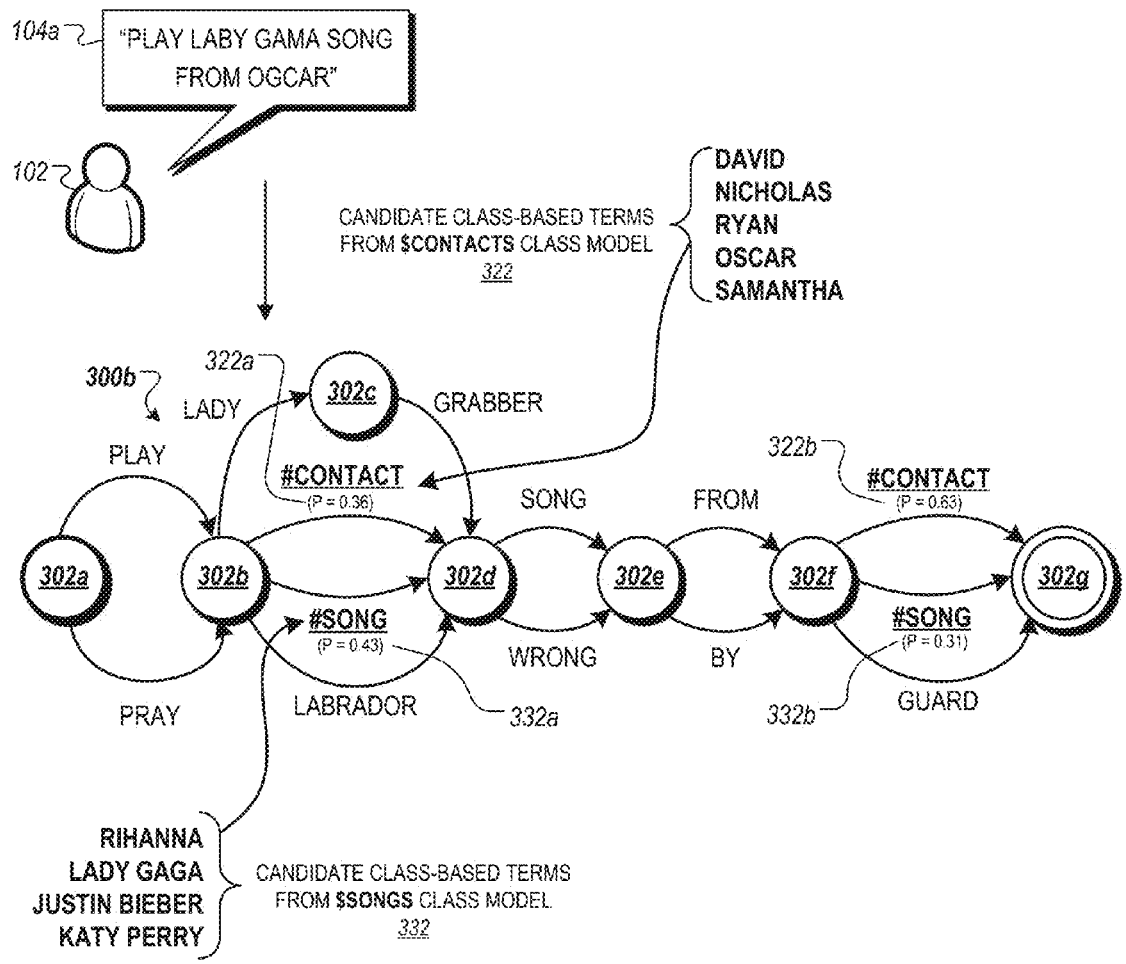
Figure 3C:
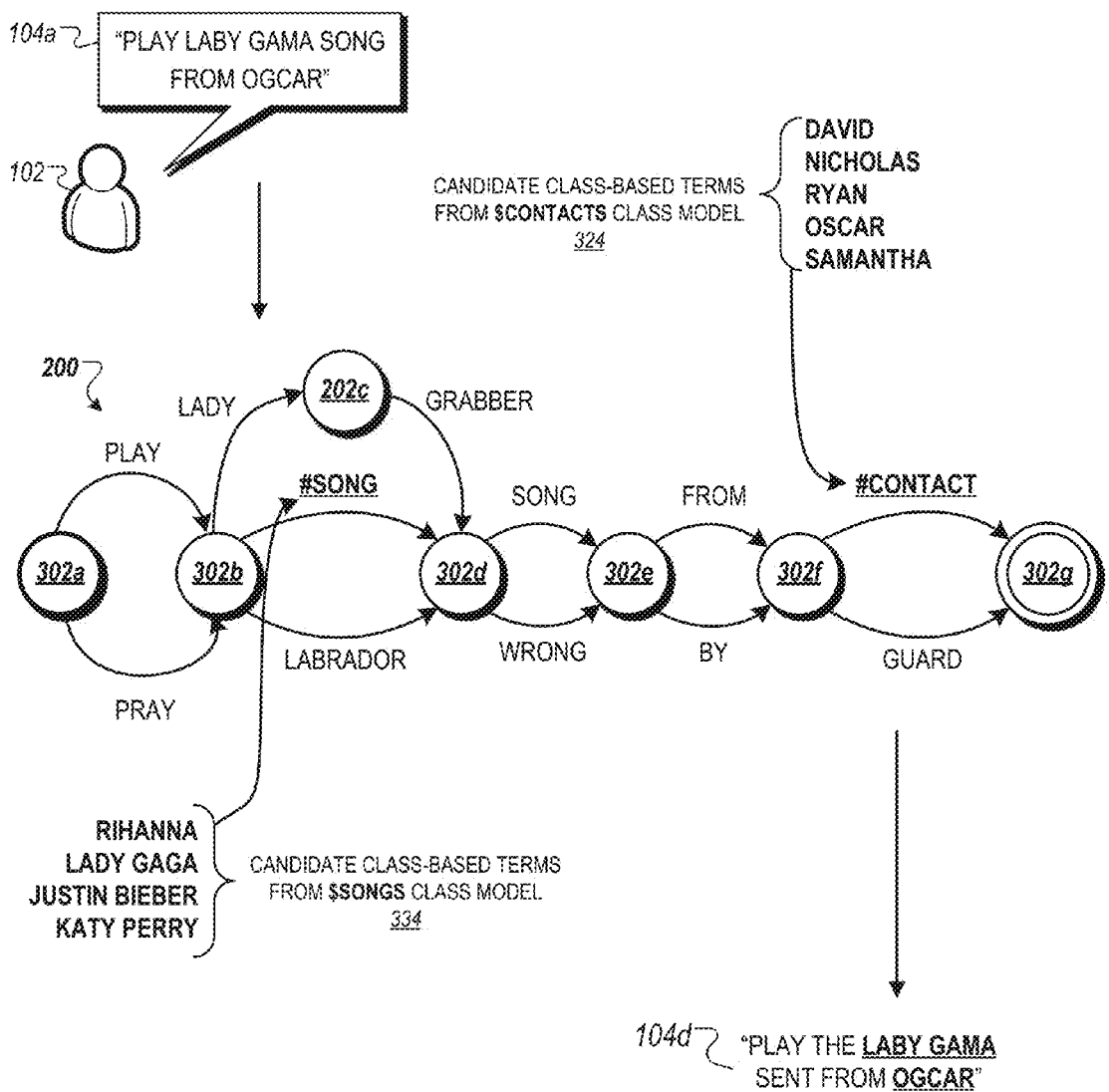

FIGS. 3A-3C depict graphical representations of word lattices 300A-300C generated by a language model for transcribing an utterance of the user 102. The lattices 300A-300C generally indicate possible transitions of terms, n-grams, and/or class symbols in language sequences that represent candidate transcriptions of a voice query. The lattices 300A-300C may also assign scores to each of the transitions that indicates a likelihood that the transition would occur in the language sequence. For example, FIG. 3A shows that the initial term in the voice query may be either 'Play' or 'Pray', as indicated by the transitions from nodes 302*a* to 302*b*. Although not shown, each transition may be scored. For example, lattice 300A may indicate a 70-percent likelihood that the first term is 'Play' and only a thirty-percent likelihood that the first term is 'Pray.' Given the preceding term as being either 'Play' or 'Pray,' the lattice 300A then indicates respective probabilities that the second term in the voice query is any of the outbound transitions from node 302*b* (e.g., 'Lady,' #unk, or 'Labrador'). In some implementations, a speech decoder may select the path through a lattice that has the highest score as indicated by the transitions as the most likely transcription of a voice query.

FIG. 3A illustrates an initial word lattice 300A that the language model has generated and that includes a residual unigram, represented by the #unk unknown terms symbol. FIG. 3B illustrates an intermediate word lattice 300B in which respective class symbols associated with different class models are inserted into the word lattice from FIG. 3A at each instance of the unknown symbol. FIG. 3C illustrates an augmented word lattice 300C in which the most probable classes are selected and individual terms from the classes are spliced into the word lattice from FIG. 3B.

In general, the system 100 initially identifies a set of residual unigrams for a particular candidate transcription sequence (e.g., "LABY GAMA" and "OGCAR" in FIG. 1). The system 100 then inserts an unknown symbol into each instance of the identified residual unigrams. During a recognition process, the system 100 then inserts a class symbol corresponding to the class model that is determined to be the most appropriate for each instance of the residual unigrams into the corresponding position of the residual unigrams within the candidate transcription sequence. Finally, the system 100 then inserts the most probable term from among the collection of terms of the appropriate class models into each instance of the class symbols.

Referring initially to FIG. 3A, the word lattice 300A is shown for transcribing an utterance for the voice query 104a of the user 102. The word lattice 300A is represented as a finite state transducer that includes one or more nodes 302a-g that correspond to possible boundaries between words. The word lattice 300A include multiple pathways for possible words in the candidate transcriptions of the utterance represented by the word lattice 300A. In addition, each of the pathways can have one or more weights or possibilities of a particular edge being the correct edge from the corresponding node. The weights can be determined by a language model and can be based on, for example, a confidence in the match between the acoustics for a corresponding portion of the utterance audio signal and the word for that edge and how well the word fits grammatically and/or lexically with other words in the word lattice 300A. In a word lattice determined by an n-gram language model, for example, the probability of a given word may be based on a statistical likelihood that the word would follow the immediately preceding n−1 words.

In the example depicted in FIG. 3A, the system 100 identifies probable paths that include possible instances of residual unigrams between nodes 302b and 302d, and between instances 302f and 302g. The system 100 then generates alternative paths that include the residual unigram symbols 312 and 314.

Referring now to FIG. 3B, the intermediate word lattice 300B provides alternative paths the class models 130a and 130b at each instance of the residual unigram symbols 312 and 314 in the word lattice 300A. As depicted, the word lattice 300B includes two alternative class-based pathways between node 302b and 302d—one with a "#CONTACT" class symbol where candidate class-based terms from the class model 130a may be inserted, and another with a "#SONG" class symbol where candidate class-based terms from the class model 130b may be inserted. The word lattice 300B also includes two alternative class-based pathways between nodes 302f and 302g for the same class models. In these two examples, the system 100 generates alternative pathways for all compiled class models at each instance of the residual unigram symbol within the word lattice. For example, although FIG. 3B depicts two class models, if the system 100 had compiled five class models, then at each instance of the residual unigram symbol between nodes, the lattice 300B would include five alternative pathways representing alternative pathways for class-based terms from each of the five compiled class models. In some implementations, the system may identify the set of class symbols to insert at each instance of the residual unigram symbol by accessing the union model that identifies labeled terms from multiple class models. Based on the labels that indicate classes associated with respective terms in the union model, the system can insert into the lattice 300B class symbols for all or some of the classes that are represented by terms in the union model.

Each alternative class-based pathway is also associated with a probability that indicates the likelihood that a class-based term is a correct term to include between two particular nodes within a transcription of the utterance of the voice query 104a. The respective class-based pathway probabilities may be computed based on, for example, the terms predicted for preceding or subsequent pathways within a transcription sequence, the present context associated with the user 102, the context associated with the received voice query 104a, among other types of linguistic indicators. In some instances, certain terms within a candidate sequence may be associated with particular class models. For example, the presence of voice commands such as "PLAY" or "REWIND" within a candidate transcription may be associated with the SONG class, whereas other phrases such as "SENT FROM" or "EMAIL TO" may be associated with the CONTACT class.

In the example depicted, the class-based pathway between nodes 302b and 302d for the "#CONTACT" symbol is associated with a probability of "0.36," whereas the alternative class-based pathway for the "#SONG" class symbol is associated with a probability of "0.43." This indicates that there is a higher likelihood that a term from the SONG class is included in this position within the correct transcription sequence of the voice query 104a. In contrast, the class-based pathway between nodes 302f and 302g for the "#CONTACT" class symbol is associated with a probability of "0.31," whereas the alternative class-based pathway for the #"SONG" class symbol is associated with a probability of "0.63," indicating that there is a higher likelihood that a term from the CONTACT class is included in this position within the correct transcription sequence of the voice query 104a.

Referring now to FIG. 3C, the word lattice 300C is shown with the most probable class selected for each instance of the residual unigrams between nodes 302b and 302d, and nodes 302f and 302g. In the example, the SONG class is selected for the first class-based pathway between nodes 302b and 302d, and the CONTACT class is selected for the second class-based pathway between nodes 302f and 302g.

The system 100 selects the most probable term within the collection of terms associated with each class to insert into each instance of the class symbol within the candidate transcription sequence. In some instances, the class term is selected based on identifying a particular term within the class model that most closely resembles a phonetic transcription of the corresponding portion of the utterance. For example, in FIG. 1, the transcription module 126 selects the SONG term "LABY GAMA" to insert into the candidate transcription sequence because this term most closely resembles the utterance "LE-DI-GA-MA" indicated by the audio data 104b.

In some implementations, instead of selecting a class term to insert at each instance of a class symbol from the corresponding class models, the system 100 may instead select the class terms from a combined model such as the union model 130d as depicted in FIG. 2. In such implementations, the system 100 may match the class identifier within the union model 130d against each instance of a class symbol to filter and select the most probable term to insert into the locations of the transcription sequence.

Figure 4:
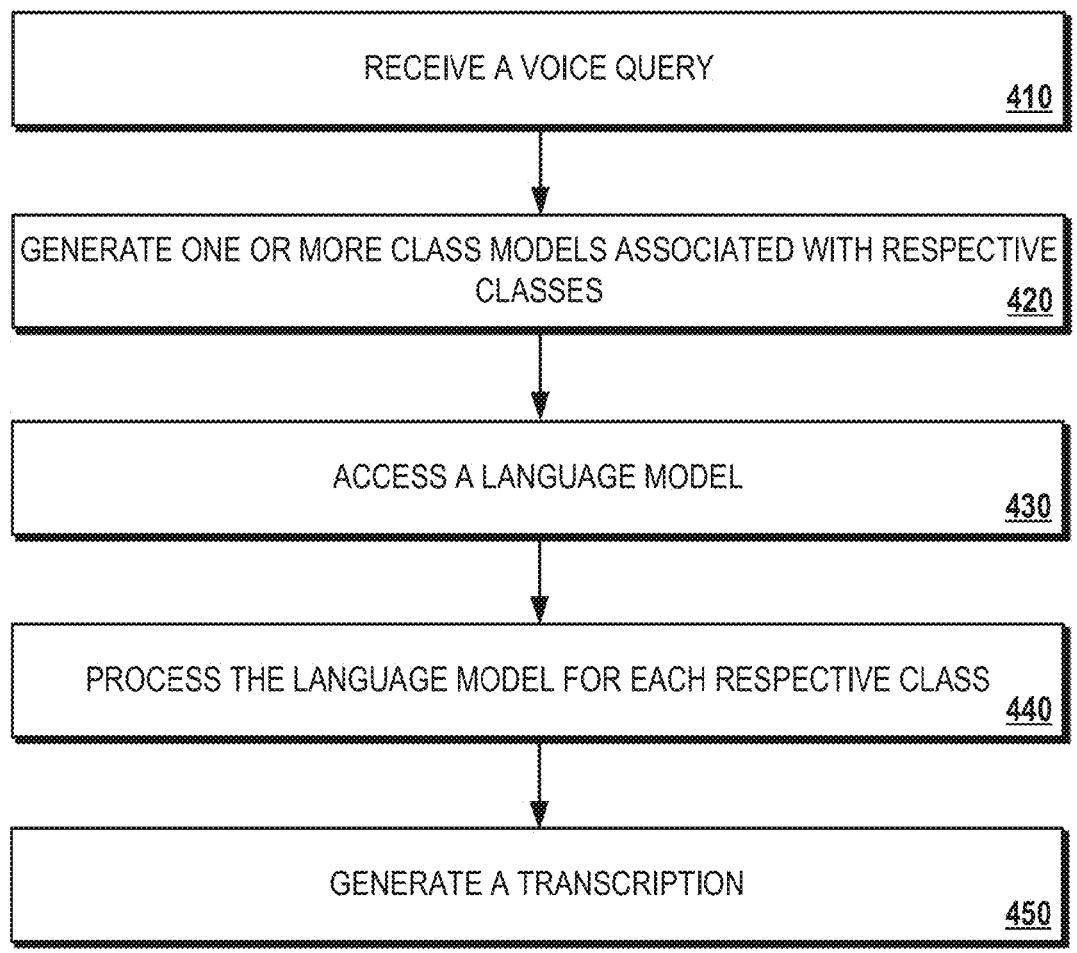
FIG. 4 is a flowchart of an exemplary process for dynamically adapting speech recognition for individual voice queries of a user using class-based language models.

FIG. 4 is a flowchart of an exemplary process 400 for dynamically adapting speech recognition for individual voice queries of a user using class-based language models. Briefly, the process 400 may include receiving a voice query (410), generating one or more class models associated with respective classes (420), accessing a language model (430), processing the language model for each respective class (440), and generating a transcription (450).

In more detail, the process 400 may include receiving a voice query (410). For instance, the server 120 may receive the voice query 104a from the user 102. The voice query 104a may include the audio data 104b corresponding to an utterance of the user 102, and context data 104c associated with either the audio data 104*b* or the user 102. For example, as depicted in FIG. 1, the context data 104*c* can be a list of contacts stored on the user device 110, or metadata associated with songs previously played by the user (e.g., song titles, artist names).

The process 400 may include generating one or more class models associated with respective classes (420). For instance, in response to receiving the voice query 104*a*, the server 120 may generate the class models 130*a* and 130*b* that collectively identify a set of terms based on the context data 104*c* that is associated with either the audio data 104*b* or the user 102. The class models 130*a* and 130*b* may also collectively identify a respective class to which each respective term in the set of terms is assigned. At least some of these terms are assigned to different classes. For example, as depicted in FIG. 1, the class models 130*a* and 130*b* are each associated with different classes (e.g., #SONG and #CONTACT classes), and identify a set of terms associated with each respective class.

The process 400 may include accessing a language model (430). For instance, the language model processor 124 of the server 120 may access the processed language model 144 that includes a residual unigram symbol representing a set of terms that are unlikely to occur within language associated with the language model 144. As described previously with respect to FIG. 1, in some implementations, the processed language model 144 may be generated by the language model processor 124 by training the initial language model 142 using training data that includes a residual unigram or class symbol that replaces, e.g., unknown terms in a language or terms that satisfy some other criteria. In other implementations, the language model processor 124 may process the initial language model 142 post-training to incorporate the terms included within the residual unigram model 130*c* to generate the processed language model 144.

The process 400 may include processing the language model for each respective class (440). For instance, the language model processor 124 of the server 20 may process the language model 144 to generate the language model 146. The processing may include inserting a respective class symbol associated with a respective class at each instance of the residual unigram that occurs within the language model 144, in order to generate the language model 146. In the example depicted in FIG. 1, the language model processor 124 inserts the symbols "#SONG" and "#CONTACT," associated with the SONG and CONTACT classes, respectively, into each instance of the "#UNK" symbol. The insertion may be performed such that each class model into each instance of a residual unigram.

The process 400 may include generating a transcription (450). For instance, the transcription module 126 of the server 120 may generate the transcription 104*d* of the utterance of the user 102 using the modified language model 144, which is then transmitted for output in response to the received voice query 104*a*.

In some implementations, the transcription module 126 may access the class-based language models 132*a* and 132*b* that correspond to the classes associated with the class models 130*a* and 130*b* to which the terms included within the class models 130*a* and 130*b* are assigned (e.g., SONG and CONTACT classes). The transcription module 126 then determines a respective probability that a term within the respective class occurs within a candidate language sequence at a position in the candidate language sequence that corresponds to a position of the respective class symbol for each respective class symbol that was inserted into the modified language model 144. This determination is based at least on the probabilities indicated by a particular one of the class-based language models 132*a* and 132*b* that corresponds to the respective class indicated by the respective class symbol associated with the class models 130*a* and 130*b*. For example, for the processed query "PLAY THE #SONG SENT FROM #CONTACT," at each instance of a respective class symbol, the transcription module 126 may identify terms to be placed in the instance of the respective class model based on the terms collectively identified by the class models 130*a* and 130*b*, and then identify the corresponding probabilities associated with the terms occurring within a candidate recognition sequence specified by the class-based language models 132*a* and 132*b*. The transcription module 126 may then generate the transcription 104*d* of the utterance of the user 102 using determined probabilities with the class-based language models 132*a* and 132*b*. Alternatively, in other instances, the transcription module 126 may initially generate the interpolated language model 146 that includes the determined probabilities within the class-based language models 132*a* and 132*b*, and then generate the transcription 104*d* using the interpolated language model 146.

Figure 5:
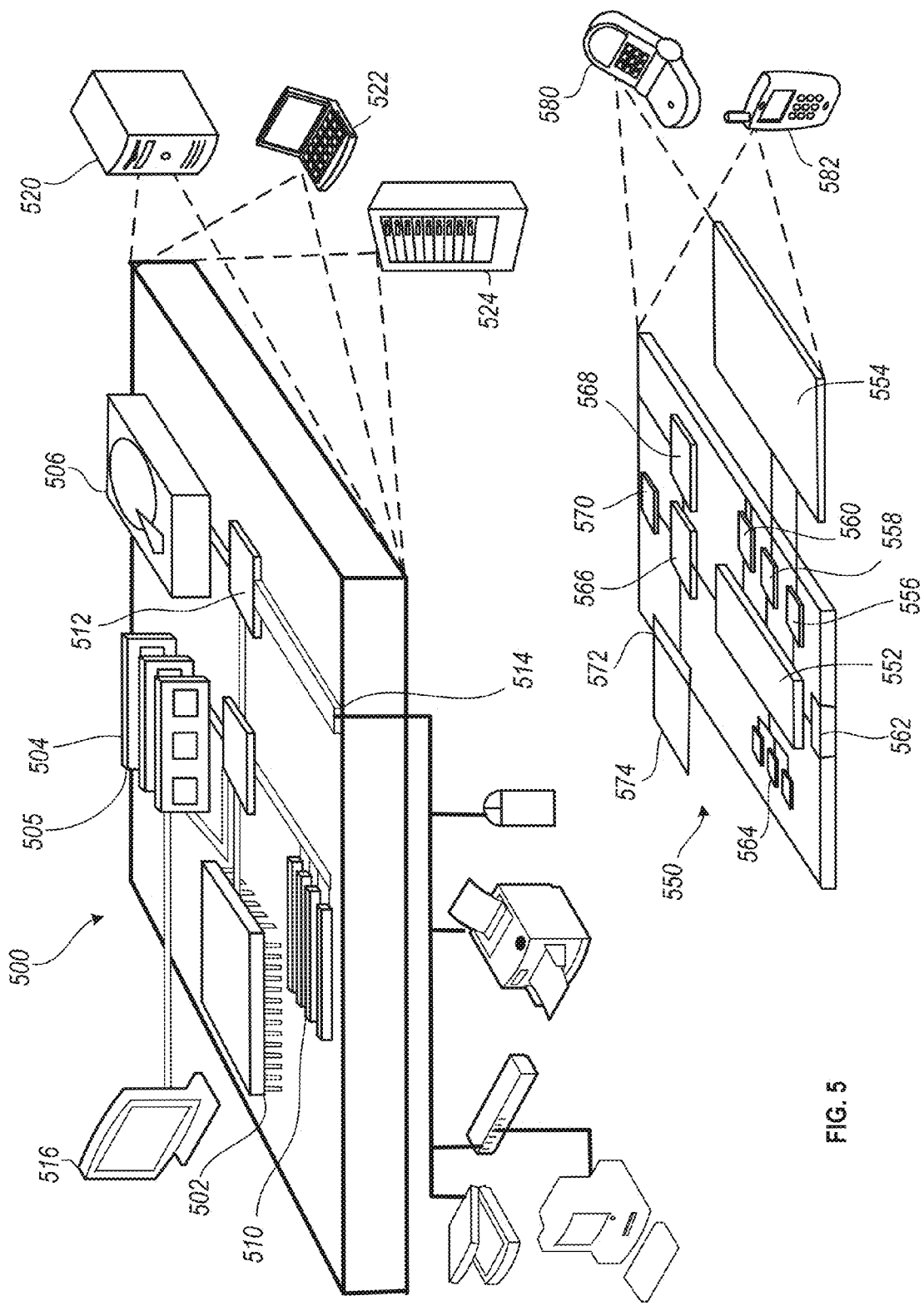
FIG. 5 is a block diagram of computing devices on which the processes described herein, or portions thereof, may be implemented.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices.

Additionally, computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc. and may also include sound generated by applications operating on device 550.

The computing device 550 may be implemented in a number of different forms, as shown in the figure. For example, it may be implemented as a cellular telephone 480. It may also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computers, the method comprising:

receiving a voice query from a user that includes (i) audio data corresponding to an utterance of the user, and (ii) context data associated with at least one of the audio data or the user;

in response to receiving the voice query, generating one or more class models based on the context data associated with the at least one of the audio data or the user, each class model identifying a respective set of terms for a corresponding class for the class model;

accessing an initial version of a model that defines scores for candidate transcriptions of the utterance, wherein the candidate transcriptions of the utterance include terms selected from a pre-defined vocabulary for a language and one or more instances of a residual unigram that represents out-of-vocabulary terms for the language;

generating a modified version of the model by replacing each instance of the residual unigram in the candidate transcriptions of the utterance with one or more class symbols that each represent a corresponding class model from the one or more class models, and rescoring the candidate transcriptions after replacing each instance of the residual unigram with the one or more class symbols; and generating a transcription of the utterance of the user using the modified version of the model.

2. The method of claim 1, wherein generating the transcription of the utterance of the user comprises:

accessing one or more class-based language models that correspond to respective classes to which one or more terms within the first set of terms are assigned;

determining, for each respective class symbol that was inserted into the modified version of the model and based at least on probabilities indicated by a particular one of the class-based language models that corresponds to the respective class indicated by the respective class symbol, a respective probability that a term within the respective class occurs within a candidate language sequence at a position in the candidate language sequence that corresponds to a position of the respective class symbol; and generating the transcription of the utterance of the user using the determined probabilities.

3. The method of claim 1, wherein:

the one or more class models comprises of a single class model that identifies the respective set of terms;

each term in the respective set of terms is labeled with a class symbol that identifies the class to which the respective term is assigned; and the single class model includes terms assigned to the different ones of the plurality of classes.

4. The method of claim 1, generating the one or more class models comprises:

generating multiple class models corresponding to different classes; and merging the multiple class models into a single class that includes terms assigned to different classes.

5. The method of claim 1, wherein the residual unigram represents infrequently occurring terms within a corpus of text samples in a language model.

6. The method of claim 1, wherein:

the residual unigram is associated with a residual class model that identifies the out-of-vocabulary terms for the language; and generating the one or more class models comprises adding the respective set of terms for the corresponding class for the class model to the residual class model.

7. The method of claim 6, wherein generating the modified version of the model comprises:

accessing the residual class model; and identifying the plurality of classes based at least on the respective set of terms in the residual class model being assigned among the plurality of classes.

8. One or more non-transitory computer-readable media having instructions stored thereon that, when executed by one or more processors, causing performance of operations comprising:

receiving a voice query from a user that includes (i) audio data corresponding to an utterance of the user, and (ii) context data associated with at least one of the audio data or the user;

in response to receiving the voice query, generating one or more class models based on the context data associated with the at least one of the audio data or the user, each class model identifying a respective set of terms for a corresponding class for the class model;

accessing an initial version of a model that defines scores for candidate transcriptions of the utterance, wherein the candidate transcriptions of the utterance include terms selected from a pre-defined vocabulary for a language and one or more instances of a residual unigram that represents out-of-vocabulary terms for the language;

generating a modified version of the model by replacing each instance of the residual unigram in the candidate transcriptions of the utterance with one or more class symbols that each represent a corresponding class model from the one or more class models, and rescoring the candidate transcriptions after replacing each instance of the residual unigram with the one or more class symbols; and generating a transcription of the utterance of the user using the modified version of the model.

9. The one or more non-transitory computer-readable media of claim 8, wherein generating the transcription of the utterance of the user comprises:

accessing one or more class-based language models that correspond to respective classes to which one or more terms within the first set of terms are assigned;

determining, for each respective class symbol that was inserted into the modified version of the model and based at least on probabilities indicated by a particular one of the class-based language models that corresponds to the respective class indicated by the respective class symbol, a respective probability that a term within the respective class occurs within a candidate language sequence at a position in the candidate language sequence that corresponds to a position of the respective class symbol; and generating the transcription of the utterance of the user using the determined probabilities.

10. The one or more non-transitory computer-readable media of claim 8, wherein:

the one or more class models comprises of a single class model that identifies the respective set of terms;

each term in the respective set of terms is labeled with a class symbol that identifies the class to which the respective term is assigned; and the single class model includes terms assigned to the different ones of the plurality of classes.

11. The one or more non-transitory computer-readable media of claim 8, wherein generating the one or more class models comprises:

generating multiple class models corresponding to different classes; and merging the multiple class models into a single class that includes terms assigned to different classes.

12. The one or more non-transitory computer-readable media of claim 8, wherein the residual unigram represents infrequently occurring terms within a corpus of text samples in a language model.

13. The one or more non-transitory computer-readable media of claim 8, wherein:

the residual unigram is associated with a residual class model that identifies the out-of-vocabulary terms for the language; and generating the one or more class models comprises adding the respective set of terms for the corresponding class for the class model to the residual class model.

14. The one or more non-transitory computer-readable media of claim 13, wherein generating the modified version of the model comprises:

accessing the residual class model; and identifying the plurality of classes based at least on the respective set of terms in the residual class model being assigned among the plurality of classes.

15. A system comprising:

one or more processors; and one or more computer-readable media including instructions that, when executed by the one or more processors, cause performance of operations comprising:

receiving a voice query from a user that includes (i) audio data corresponding to an utterance of the user, and (ii) context data associated with at least one of the audio data or the user;

in response to receiving the voice query, generating one or more class models based on the context data associated with the at least one of the audio data or the user, each class model identifying a respective set of terms for a corresponding class for the class model;

accessing an initial version of a model that defines scores for candidate transcriptions of the utterance, wherein the candidate transcriptions of the utterance include terms selected from a pre-defined vocabulary for a language and one or more instances of a residual unigram that represents out-of-vocabulary terms for the language;

generating a modified version of the model by replacing each instance of the residual unigram in the candidate transcriptions of the utterance with one or more class symbols that each represent a corresponding class model from the one or more class models, and rescoring the candidate transcriptions after replacing each instance of the residual unigram with the one or more class symbols; and generating a transcription of the utterance of the user using the modified version of the model.

16. The system of claim 15, wherein generating the transcription of the utterance of the user comprises:

receiving a voice query from a user that includes (i) audio data corresponding to an utterance of the user, and (ii) context data associated with at least one of the audio data or the user;

in response to receiving the voice query, generating one or more class models based on the context data associated with the at least one of the audio data or the user, each class model identifying a respective set of terms for a corresponding class for the class model;

accessing an initial version of a model that defines scores for candidate transcriptions of the utterance, wherein the candidate transcriptions of the utterance include terms selected from a pre-defined vocabulary for a language and one or more instances of a residual unigram that represents out-of-vocabulary terms for the language;

generating a modified version of the model by replacing each instance of the residual unigram in the candidate transcriptions of the utterance with one or more class symbols that each represent a corresponding class model from the one or more class models, and rescoring the candidate transcriptions after replacing each instance of the residual unigram with the one or more class symbols; and generating a transcription of the utterance of the user using the modified version of the model.

17. The system of claim 15, wherein:

the one or more class models comprises of a single class model that identifies the respective set of terms;

each term in the respective set of terms is labeled with a class symbol that identifies the class to which the respective term is assigned; and the single class model includes terms assigned to the different ones of the plurality of classes.

18. The system of claim 15, wherein generating the one or more class models comprises:

generating multiple class models corresponding to different classes; and merging the multiple class models into a single class that includes terms assigned to different classes.

19. The system of claim 15, wherein the residual unigram represents infrequently occurring terms within a corpus of text samples in a language model.

20. The system of claim 15, wherein:

the residual unigram is associated with a residual class model that identifies the out-of-vocabulary terms for the language; and generating the one or more class models comprises adding the respective set of terms for the corresponding class for the class model to the residual class model.

21. The method of claim 1, wherein generating the transcription of the utterance using the modified version of the model comprises determining a sequence of terms for the transcription that includes at least one term selected from the one or more class models in place of the residual unigram.

22. The method of claim 1, wherein the model comprises a word lattice.

* * * * *

UNITED STATES PATENT AND TRADEMARK OFFICE
CERTIFICATE OF CORRECTION

PATENT NO. : 10,229,675 B2
APPLICATION NO. : 15/396045
DATED : March 12, 2019
INVENTOR(S) : Scheiner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 118 days.

Signed and Sealed this
Twenty-ninth Day of October, 2019

Andrei Iancu
*Director of the United States Patent and Trademark Office*